Dec. 5, 1961  H. A. GUTHANS  3,011,835
STERN BEARING PACKING GLANDS
Filed Oct. 14, 1958  2 Sheets-Sheet 1

INVENTOR.
Harold A. Guthans
BY
his attorneys

Dec. 5, 1961 H. A. GUTHANS 3,011,835
STERN BEARING PACKING GLANDS
Filed Oct. 14, 1958 2 Sheets-Sheet 2

INVENTOR.
Harold A. Guthans

United States Patent Office 3,011,835
Patented Dec. 5, 1961

3,011,835
STERN BEARING PACKING GLANDS
Harold A. Guthans, 2201 Springfield Ave.,
Mobile 17, Ala.
Filed Oct. 14, 1958, Ser. No. 767,179
16 Claims. (Cl. 308—36.1)

This invention relates to stern bearing packing glands and particularly to a novel stern bearing packing gland which incorporates a floating packing assembly. The stern bearing of a water-going vessel performs a very vital function under extremely difficult conditions. Not only is it subject to failure from the corrosive action of water and contamination and abrasive action of sand and other particles found in the water, but also, it is subject to premature failure from the wearing characteristics of its own parts. Long observation and experimentation has shown that failure of conventional stern bearing glands very often results from the fact that the propeller shaft from the time it is initially installed wears most heavily on the packing material at the bottom. As the time goes on wear takes place and causes the propeller shaft to move down even more heavily on the packing material at the bottom. The effect of this on the packing material is that the packing material becomes too tightly packed at the bottom. In addition, the rotation of the propeller shaft draws down the packing material from above in the direction of the rotation of the shaft and thus packs or tucks in more packing material under the propeller shaft making it even tighter at the bottom, sometimes to the extent that the propeller shaft is riding on the packing material instead of the stern bearing, which may cause the packing material to burn up. The corresponding effect on the packing at the top is, of course, just the reverse. The packing material at the top becomes too loose and eventually leakage occurs. Deterioration of the conventional gland proceeds in geometric progression, i.e., the more the bearing wears down, the more it tucks the packing, and the more it tucks the packing the sooner it leaks at the top and once leakage occurs deterioration of the gland is very rapid.

In addition, grooving of the propeller shaft adjacent the packing material is often the result of the packing material being tucked and packed down hard at the bottom of the propeller shaft.

Further observation and experimentation with conventional stern bearing glands shows that too high pressure on the lubricant being fed to the bearing has a deteriorating effect in that it will force out or break the grease seals formed at the various joints and also places too much pressure on the packing material.

The present invention provides a stern bearing gland which overcomes these problems and successfully eliminates the packing down and tucking of the packing material at the bottom of the shaft along with the deteriorating effects thereof by equalizing the pressure on the packing material around the entire circumference of the propeller shaft, and too high lubricant pressures along with its deteriorating effects by providing a relief valve. In a preferred embodiment of my invention I provide a housing surrounding a propeller shaft extending from a bearing surrounding a propeller shaft, packing means within the housing and surrounding the propeller shaft movable with the propeller shaft in directions both substantially parallel and substantially transverse to the axis of the propeller shaft, including a lubrication fitting and channel to the bearing with a relief valve adapted to operate at excessive lubrication pressures.

Other details, objects and advantages of the invention will become apparent as the following description of a present preferred embodiment thereof proceeds.

In the accompanying drawings, I have shown a present preferred embodiment of the invention in which FIGURE 1 is a longitudinal section through a stern bearing and propeller shaft assembly of a sea-going vessel showing the packing gland of my invention;

Figure 1:
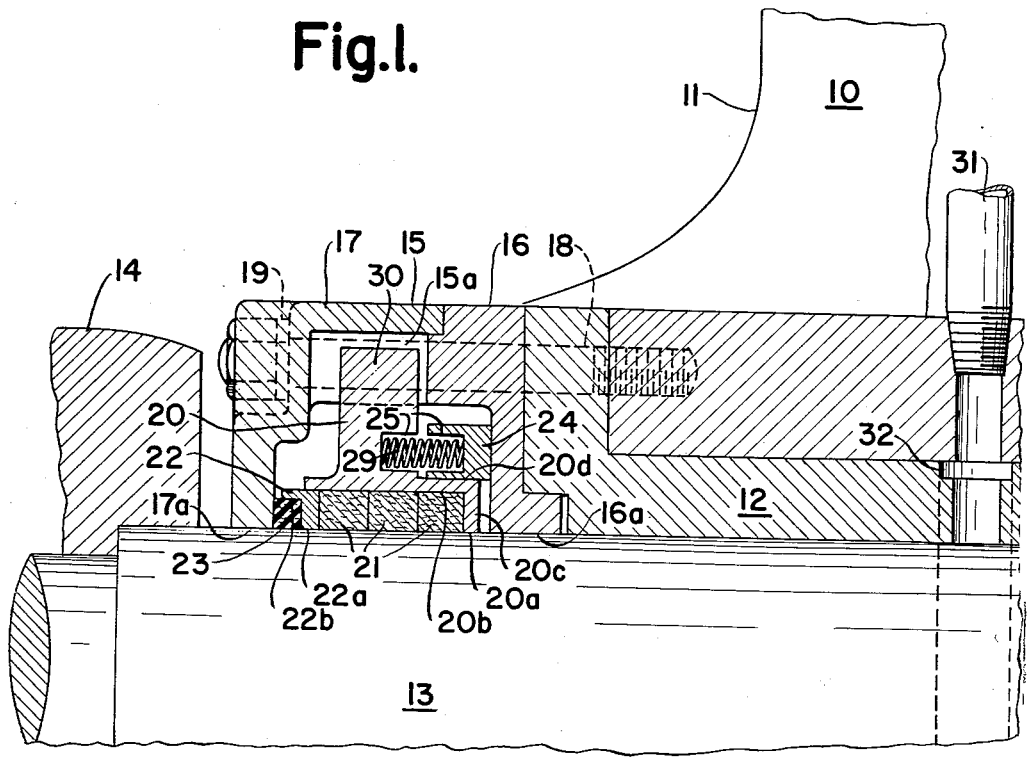
Figure 2:
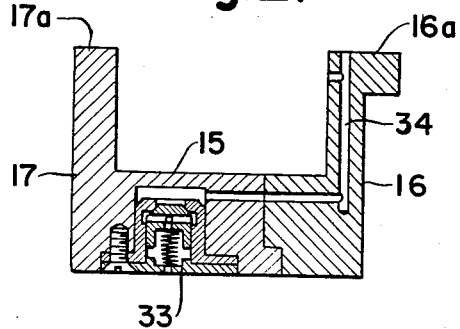
FIGURE 2 is a segmental section through the housing of the bearing gland showing the lubrication pressure relief valve.
Figure 3:
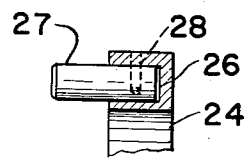
FIGURE 3 is a segmental section through a positioning ring of FIGURE 1.
Figure 4:
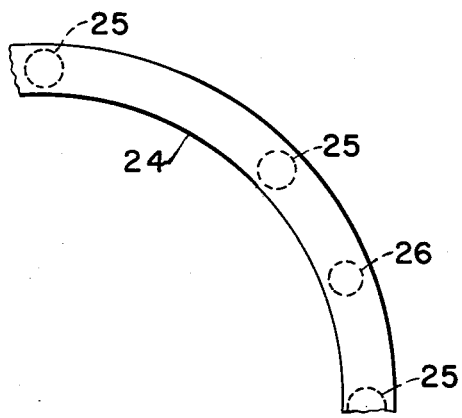
FIGURE 4 is an elevational view of the positioning ring of FIGURE 1.
Figure 5:
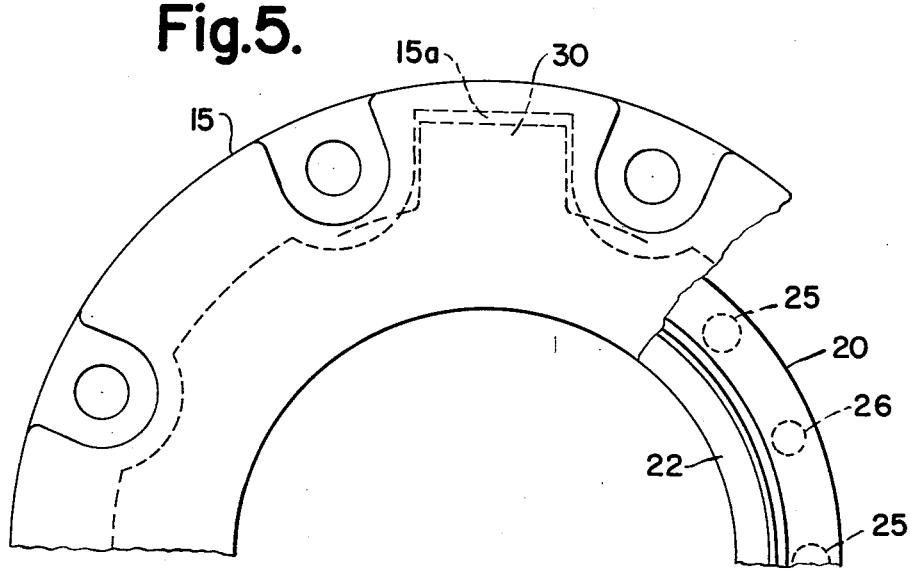
FIGURE 5 is an elevational view of the housing and packing ring of FIGURE 1.

Referring now to the drawings and in particular to FIGURE 1, a seagoing vessel 10 having a strut portion 11 is provided with a stern bushing 12 of bronze or other suitable material fitted into the strut at the propeller opening. The propeller shaft 13 passes through the bushing 12 and extends outwardly from the strut to carrying the propeller 14. A bearing gland housing assembly 15 made up of an inner face plate 16, and an outer cap 17 is fixed to the stern bushing 12 and strut 11 by bolts 18. Suitable lock washers 19 may be provided to insure good attachment. Propeller shaft 13 passes through openings 16a and 17a in the inner face plate 16 and outer cap 17 respectively.

Within housing 15, I provide an annular packing ring 20 having an opening 20a through which propeller shaft 13 passes. Packing ring 20 contains a well section 20b adjacent the propeller shaft within which packing material 21 such as channel flax is placed around the propeller shaft. The well section 20b is formed by a radially inwardly extending flange 20c and a packing retainer ring 22 which fits around the propeller shaft and partially extends into the opening 20a of packing ring 20. Retainer ring 22 is freely slidable in opening 20a to bear against and to seal packing material 21 in said well section. Retainer ring 22 is provided with an axially extending annular flange 22a forming a recess 22b adjacent the propeller shaft for the reception of sealing ring 23 which is placed around the propeller shaft and partially extends into said recess in retainer ring 22. Sealing ring 23 is preferably made of a resilient material, which is resistant to the deteriorating effects of lubricants, such as Bunal rubber. Between inner face plate 16 and packing ring 20 is positioning ring 24 which fits around shoulder 20d of packing ring 20. Spaced around the positioning ring 24 and packing ring 20 are a series of holes 25 and 26 arranged so that the holes 25 and 26 in positioning ring 24 will be in matching alignment with corresponding holes 25 and 26 in packing ring 20. Dowels 27 are anchored to positioning ring 24 by pins 28 and are freely movable in holes 26 of the packing ring. Thus positioning ring 24 is permitted to move freely axially along the shoulder portion 20d of packing ring 20 parallel to the axis of propeller shaft 13, but is prevented from rotating about said axis thereby keeping holes 25 and 26 in positioning ring 24 and packing ring 20 aligned. Within holes 25 of the positioning ring 24 and packing ring 20 are located springs 29 which constantly urge positioning ring 24 away from packing ring 20. Thus positioning ring 24 is constantly urged against inner face plate 16 while packing ring 20, packing material 21 and retaining ring 22, are constantly urged toward outer cap 17, thereby urging sealing ring 23 against outer cap 17.

The positioning ring 24 is freely slidable both circumferentially and radially on inner face plate 16. Likewise, sealing ring 23 is freely slidable both circumferentially and radially against outer cap 17. Thus the entire packing assembly is free to move within the housing assembly 15 in a direction substantially perpendicular to the axis of the propeller shaft. As a result the weight of propeller shaft 13 is never placed upon packing material 21 even as propeller shaft 13 moves down with the passage of time but on the contrary the packing material moves freely with the shaft. Hence the pressure on packing material 21 is substantially equalized all around the propeller shaft thereby substantially eliminating the tendency of the packing material to tuck and pack down hard around the bottom of the propeller shaft.

The pressure on packing material 21 is further equalized due to the fact that packing ring 20 is in free axially slidable engagement with packing retainer ring 22 and positioning ring 24 and thus is permitted to move with propeller shaft 13 in a direction substantially parallel to the axis of the propeller shaft.

Substantial rotation of packing ring 20 is prevented by lug like extensions 30, located around the periphery thereof preferably at the top and at the bottom of packing ring 20 and being integral parts thereof. These lugs 20—30 extend sufficiently radially from packing ring 20 so as to project into spaces 15a located at the top and bottom inside housing 15 between bolts 18 while leaving sufficient space between the ends of lugs 30 and housing 15 so that packing ring 20 is left free to move in directions substantially transverse and substantially parallel to the axis of propeller shaft 13 but is restrained from rotating with the propeller shaft by the attachment of lugs 30 within spaces 15a.

I further provide in my present preferred embodiment a lubrication fitting 31 and channel 32 in bearing 12 for the admission of lubricant into my stern bearing gland. A relief valve 33 and channel 34 are located in housing assembly 15, relief valve 33 being set to operate at pressures, greater than ordinary lubrication pressure, whereby, when too high lubricating pressures are applied, lubricant will be permitted to escape through relief valve 33 and thereby prevent the grease seals formed at the various joints from being broken or forced out and relieve any excessive pressure on the packing material.

While I have shown and described a present preferred embodiment of the invention it is to be distinctly understood that the invention is not limited thereto but may be otherwise variously embodied within the scope of the following claims.

I claim:

1. A bearing gland for propeller shafts and the like rotary shafts subject to external pressure comprising a hollow housing assembly extending from a bearing surrounding a propeller shaft, a packing ring element within said housing assembly and surrounding the propeller shaft, said packing ring element having an extension in loose engagement with the housing assembly whereby the packing ring element is substantially prevented from rotating with the propeller shaft, a well section in said packing ring element adjacent to the propeller shaft, packing material within said well section, a packing retaining ring element and sealing ring means within the housing and coaxial with the packing ring element, a positioning ring means within the housing resiliently engaging said packing ring element and urging said packing ring element toward the packing retaining ring element whereby the packing ring element, positioning ring means, packing material, and packing retaining ring element are sufficiently free to move with the propeller shaft in directions both substantially parallel and substantially transverse to the rotational axis of the propeller shaft.

2. A bearing gland for propeller shafts and the like rotary shafts subject to external pressure comprising a hollow housing assembly extending from a bearing surrounding a propeller shaft, a packing ring element within the housing assembly and surrounding the propeller shaft, said packing ring element containing a lug-like extension on its outer periphery in loose engagement with said housing assembly whereby the packing ring element is substantially prevented from rotary movement without impeding lateral and transverse movement in relation to its axis, a well section in said packing ring element adjacent the propeller shaft, packing material in said well section, a packing retaining ring element and sealing ring means all surrounding the propeller shaft, a positioning ring means within the housing resiliently engaging the packing ring element and urging said packing ring toward the retaining ring element whereby the packing ring element, the positioning ring means, the packing material and the packing retaining ring element are sufficiently free to move with the propeller shaft in directions both substantially parallel and substantially transverse to the rotational axis of the propeller shaft.

3. A bearing gland for propeller shafts and the like rotary shafts subject to external pressure comprising a hollow cylindrical housing assembly extending from a bushing surrounding a propeller shaft, a packing ring element within the housing assembly and surrounding the propeller shaft, said packing ring element containing at least one lug-like extension on its outer periphery in loose engagement with said housing assembly whereby the packing ring element is substantially restrained from rotating without impairing its movement with the propeller shaft, in directions both substantially parallel and substantially transverse to the rotational axis of the propeller shaft, a well section in said packing ring element adjacent the propeller shaft, packing material within said well section surrounding the shaft and in contact therewith, a packing retaining ring means, a sealing ring means in said packing retaining ring means, all surrounding the propeller shaft, a positioning ring means within the housing assembly surrounding a portion of the packing ring element in sliding engagement, spring means between the packing ring element and positioning ring means whereby they are each urged away from the other toward their respective sides of the housing assembly, said packing ring element, positioning ring means, packing material and packing ring retaining means being free to move with the propeller shaft in directions both substantially parallel and substantially transverse to the rotational axis of the propeller shaft.

4. A bearing gland for propeller shafts and the like rotary shafts subject to external pressure comprising a hollow cylindrical housing assembly of inner and outer portions united by fastening means in substantially rigid engagement with a stern bushing both of which surround a propeller shaft, a packing ring element within the housing assembly and surrounding the propeller shaft, said packing ring element containing at least one lug element on its outer periphery in loose engagement with said housing assembly whereby the packing ring element is substantially restrained from rotating with the propeller shaft without impairing its movement with the propeller shaft in directions both substantially parallel and substantially transverse to the rotational axis of the propeller shaft, a well section in said packing ring element adjacent to and surrounding the propeller shaft, packing material in said well section, a packing retaining ring element surrounding said propeller shaft and partially within said well section, a well section within said packing retaining ring element adjacent to and surrounding said propeller shaft, a sealing ring means partially within said second mentioned well section, a positioning ring element within the housing assembly and surrounding a portion of the packing ring element and in slidable engagement therewith, spring means between the packing ring element and positioning ring element whereby the packing ring element urges the sealing ring means against the inside of the outer portion of the housing assembly while the positioning ring means is urged against the inside of the inner portion of the housing assembly in a sliding engagement therewith whereby the elements and means located within the housing assembly are free to move with the propeller shaft in directions substantially parallel and substantially transverse to the rotational axis of the propeller shaft.

5. A bearing gland to propeller shafts and the like rotary shafts subject to external pressure in accordance with claim 1 including a lubriction fitting element and channel means to said bearing whereby lubrication may be administered to the bearing and the bearing gland and a relief valve means adapted to operate at excessive lubrication pressures whereby lubricant entering the housing assembly at excessive pressure bypasses the bearing gland through the relief valve.

6. A bearing gland for propeller shafts and the like rotary shafts subject to external pressure in accordance with claim 2 including a lubrication fitting element and channel means to said bearing whereby lubrication may be administered to the bearing and the bearing gland, and a relief valve means adapted to operate at excessive lubrication pressures whereby lubricant entering the housing assembly at excessive pressure bypasses the bearing gland through the relief valve.

7. A bearing gland for propeller shafts and the like rotary shafts subject to external pressure in accordance with claim 3 including a lubrication fitting element and channel means to said bushing whereby lubrication may be administered to the bushing and the bearing gland, and a relief valve means adapted to operate at excessive lubrication pressures whereby lubricant entering the housing assembly at excessive pressure bypasses the bearing gland through the relief valve.

8. A bearing gland for propeller shafts and the like rotary shafts subject to external pressure in accordance with claim 4 including a lubrication fitting element and channel means to said stern bushing whereby lubrication may be administered to the stern bushing and the bearing gland, and a relief valve means adapted to operate at excessive lubrication pressures whereby lubricant entering the housing assembly at excessive pressure bypasses the bearing gland through the relief valve.

9. A bearing gland for propeller shafts and the like rotary shafts subject to external pressure comprising a hollow housing assembly extending from a bearing surrounding a propeller shaft, a packing assembly surrounding the propeller shaft within said housing assembly, said packing assembly comprising a packing ring element having a well section adjacent to the propeller shaft, packing material within said well section, a retaining ring member adapted to retain said packing material within said well section, positioning ring means adapted to resiliently urge the retaining ring element against the packing material, and sealing ring means, said sealing ring means and positioning ring means being in slidable engagement with their respective sides of the housing assembly whereby said packing assembly is free to move with the propeller shaft in directions substantially transverse to the rotational axis of the propeller shaft, said retaining ring element and positioning ring means being in slidable engagement with the packing ring element whereby said packing assembly is free to move with the propeller shaft in directions substantially parallel to the rotational axis of the propeller shaft and means holding said packing assembly against free rotation with the propeller shaft.

10. A bearing gland for propeller shafts and the like rotary shafts subject to external pressure comprising a hollow housing assembly extending from a bearing surrounding a propeller shaft, a packing assembly within said housing assembly and surrounding the propeller shaft, said packing assembly comprising a packing ring element having a well section adjacent said propeller shaft, packing material within said well section, a retaining ring member adapted to retain said packing material within said well section, positioning ring means resiliently engaging said packing ring element whereby the packing material is urged against the retaining ring member, said retaining ring member having a well section adjacent the propeller shaft and sealing ring means partially within said well section, said sealing ring means and positioning ring means being in slidable engagement with their respective sides of the housing assembly whereby said packing assembly is free to move with the propeller shaft in directions substantially transverse to the rotational axis of the propeller shaft, said retaining ring element and positioning ring means being in slidable engagement with the packing ring element whereby said packing assembly is free to move with the propeller shaft in directions substantially parallel to the rotational axis of the propeller shaft and means holding said packing assembly against free rotation with the propeller shaft.

11. A bearing gland for propeller shafts and the like rotary shafts subject to external pressure comprising a hollow housing assembly extending from a bearing surrounding a propeller shaft, a packing assembly surrounding the propeller shaft within said housing assembly, said packing assembly comprising a packing ring element containing a well section adjacent to and surrounding the propeller shaft, packing material within said well section, a retaining ring member partially within said well section slidably engageable therewith and adapted to retain said packing material within said well section, a well section in said retaining ring member adjacent to and surrounding the propeller shaft, sealing ring means partially within said retaining ring well section and slidably bearing against a wall of the housing, a positioning ring member surrounding a portion of the packing ring element and in slidable engagement therewith and bearing against the wall of the housing opposite said first mentioned housing wall, spring means between the packing ring element and positioning ring member whereby the positioning ring member and the sealing ring means are resiliently urged against their respective sides of the housing assembly and the packing material is resiliently urged against the retaining ring member, whereby said packing assembly is free to move with the propeller shaft in directions substantially parallel and substantially transverse to the rotational axis of the propeller shaft and means holding said packing assembly against free rotation with the propeller shaft.

12. A bearing gland for propeller shafts and the like rotary shafts subject to external pressure comprising a hollow housing assembly extending from a bearing surrounding a propeller shaft, a packing assembly surrounding the propeller shaft within said housing assembly, said packing assembly comprising a packing ring element containing a well section adjacent to and surrounding the propeller shaft, packing material within said well section, a retaining ring member partially within said well section slidably engageable therewith and adapted to retain said packing material within said well section, a well section in said retaining ring member adjacent to and surrounding the propeller shaft, sealing ring means partially within said retaining ring well section and slidably bearing against a wall of the housing, a positioning ring member surrounding a portion of the packing ring element and in slidable engagement therewith and bearing against the wall of the housing opposite said first mentioned housing wall, spring means between the packing ring element and positioning ring member whereby the positioning ring member and the sealing ring means are resiliently urged against their respective sides of the housing assembly and the packing material is resiliently urged against the retaining ring member, whereby said packing assembly is free to move with the propeller shaft in directions substantially parallel and substantially transverse to the rotational axis of the propeller shaft and lug means extending from said packing ring element in loose engagement with said housing assembly whereby the packing assembly is substantially restrained from rotating with the propeller shaft without impairing the movement of the packing assembly with the propeller shaft in directions substantially parallel and substantially transverse to the rotational axis of the propeller shaft.

13. A bearing gland for propeller shafts and the like rotary shafts subject to external pressure in accordance with claim 9 including a lubrication fitting element and channel means to said bearing whereby lubrication may be administered to the bearing and the bearing gland, and relief valve means adapted to operate at excessive lubrication pressures whereby lubricant entering the housing assembly at excessive pressure bypasses the bearing gland through the relief valve.

14. A bearing gland for propeller shafts and the like rotary shafts subject to external pressure in accordance with claim 10 including a lubrication fitting element and channel means to said bearing whereby lubrication may be administered to the bearing and the bearing gland, and relief valve means adapted to operate at excessive lubrication pressures whereby lubricant entering the housing assembly at excessive pressure bypasses the bearing gland through the relief valve.

15. A bearing gland for propeller shafts and the like rotary shafts subject to external pressure in accordance with claim 11 including a lubrication fitting element and channel means to said bearing whereby lubrication may be administered to the bearing and the bearing gland, and relief valve means adapted to operate at excessive lubrication pressures whereby lubricant entering the housing assembly at excessive pressure bypasses the bearing gland through the relief valve.

16. A bearing gland for propeller shafts and the like rotary shafts subject to external pressure in accordance with claim 12 including a lubrication fitting element and channel means to said bearing whereby lubrication may be administered to the bearing and the bearing gland, and relief valve means adapted to operate at excessive lubrication pressures whereby lubricant entering the housing assembly at excessive pressure bypasses the bearing gland through the relief valve.

References Cited in the file of this patent
UNITED STATES PATENTS

| | | |
|---|---|---|
| 200,458 | Jerome | Feb. 19, 1878 |
| 400,543 | Brockett | Apr. 2, 1889 |
| 712,966 | Rockwell | Nov. 4, 1902 |
| 721,287 | Cushman | Feb. 24, 1903 |
| 796,618 | Wenner | Apr. 27, 1905 |
| 2,186,537 | Salisbury | Jan. 9, 1940 |
| 2,283,871 | Norelius | May 19, 1942 |
| 2,328,578 | Payne | Sept. 7, 1943 |
| 2,797,940 | Michener et al. | July 2, 1957 |